Oct. 21, 1969  W. SIEPMANN  3,473,785
VALVE BODY FOR GLOBE VALVES OR THE LIKE
Filed May 23, 1967  4 Sheets-Sheet 1

INVENTOR
WALTER SIEPMANN
BY Michael S Striker,
his ATTORNEY

Oct. 21, 1969  W. SIEPMANN  3,473,785
VALVE BODY FOR GLOBE VALVES OR THE LIKE
Filed May 23, 1967  4 Sheets-Sheet 4

INVENTOR
WALTER SIEPMANN
BY
his ATTORNEY

United States Patent Office 3,473,785
Patented Oct. 21, 1969

3,473,785
VALVE BODY FOR GLOBE VALVES
OR THE LIKE
Walter Siepmann, Belecke (Mohne), Germany, assignor to
Eugen Vogt, Birrwil, Switzerland
Filed May 23, 1967, Ser. No. 640,609
Claims priority, application Germany, May 31, 1966,
V 31,162
Int. Cl. F16k 1/06, 25/00
U.S. Cl. 251—366       17 Claims

ABSTRACT OF THE DISCLOSURE

A T-shaped valve body for globe valves comprises two sections which are welded to each other in a first reference plane and are of substantially circular outline, i.e., their width approximates their length. The sections are provided with arcuate internal ribs which are welded to a one-piece seat ring, and the seat ring is located in or is parallel with the reference plane. Each section comprises a substantially conchoidal part which extends from one end of the valve body toward the concave side of the respective rib and has a constant depth but flares in a direction toward the respective rib. The mass of fluid which enters through the inlet in the form of a solid cylindrical stream is flattened out during travel toward the passage of the valve seat and is thereupon gradually reconverted into a solid cylindrical stream which flows through the outlet. The resistance which the seat ring and ribs offer to the flow of fluid is relatively low.

One of the sections carries an annulus whose opening is coaxial with the passage of the seat ring, and such annulus is preferably integral with and extends from a flat external surface of the respective conchoidal part.

BACKGROUND OF THE INVENTION

The present invention relates to valve bodies for globe valves or the like. More particularly, the invention relates to a valve body which is particularly suited for use in large valves of the type wherein the valve body normally consists of several sections.

It is already known to assemble relatively large valve bodies of sections which are produced by drop forging. Such bodies are utilized in valves which are installed in pipe lines with a diameter in excess of 65 mm. As a rule, the manufacture of relatively large valve bodies is more economical if they are assembled of several separately produced sections.

It is an important object of the present invention to provide a substantially T-shaped valve body which can be manufactured with little waste in material and is constructed and assembled in such a way that it offers relatively low resistance to the flow of fluid medium.

Another object of the invention is to provide a multi-section valve body for globe valves wherein the sections are configurated in such a way that each thereof can be produced in relatively simple drop forging machinery.

A further object of the invention is to provide a valve body wherein the sections can be bonded to each other by resorting to available welding apparatus.

An additional object of the invention is to provide a valve body wherein the seat ring can be produced of high-quality material and can be finished prior to complete assembly of the valve body.

A concomitant object of the invention is to provide a valve body of relatively lightweight construction and compact design, and to assemble the body of sections which can be produced at reasonable cost.

SUMMARY OF THE INVENTION

The present invention is embodied in a substantially T-shaped valve body which is particularly suited for use in relatively large globe valves. The valve body has a circular inlet at one end, a circular outlet at the other end, a circular opening intermediate its ends, a first reference plane halving the inlet and the outlet at the inner side of the opening, and a second reference plane which is normal to the first plane and halves the opening. The valve body comprises a first section which is located at one side of the first reference plane and is provided with the aforementioned opening, and a mating second section at the other side of the first reference plane. The length of the sections between the inlet and the outlet approximates their width and the sections are provided with arcuate internal ribs disposed substantially at the opposite sides of the second reference plane and having concave sides which face the second plane. Each of the two sections further includes a shallow conchoidal part extending from one end of the valve body to the respective rib and each conchoidal part has a substantially constant depth, as considered at right angles to the first reference plane, and flares outwardly from the respective end toward the second plane.

The first section of the valve body is provided with an integral external cover-supporting annulus whose opening registers with the opening of the first section and whose height, as considered at right angles to the first reference plane, is preferably constant.

The valve body further comprises a seat ring which is recessed into one or both ribs and is located substantially in the first reference plane. The seat ring has an oval or nearly oval outline with the longer axis of the oval outline located substantially in or parallel to the second reference plane.

The novel features which are considered as characteristic of the invention are set forth in particular in the appended claims. The improved valve body itself, however, both as to its construction and the method of manufacturing and assembling the same, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2:
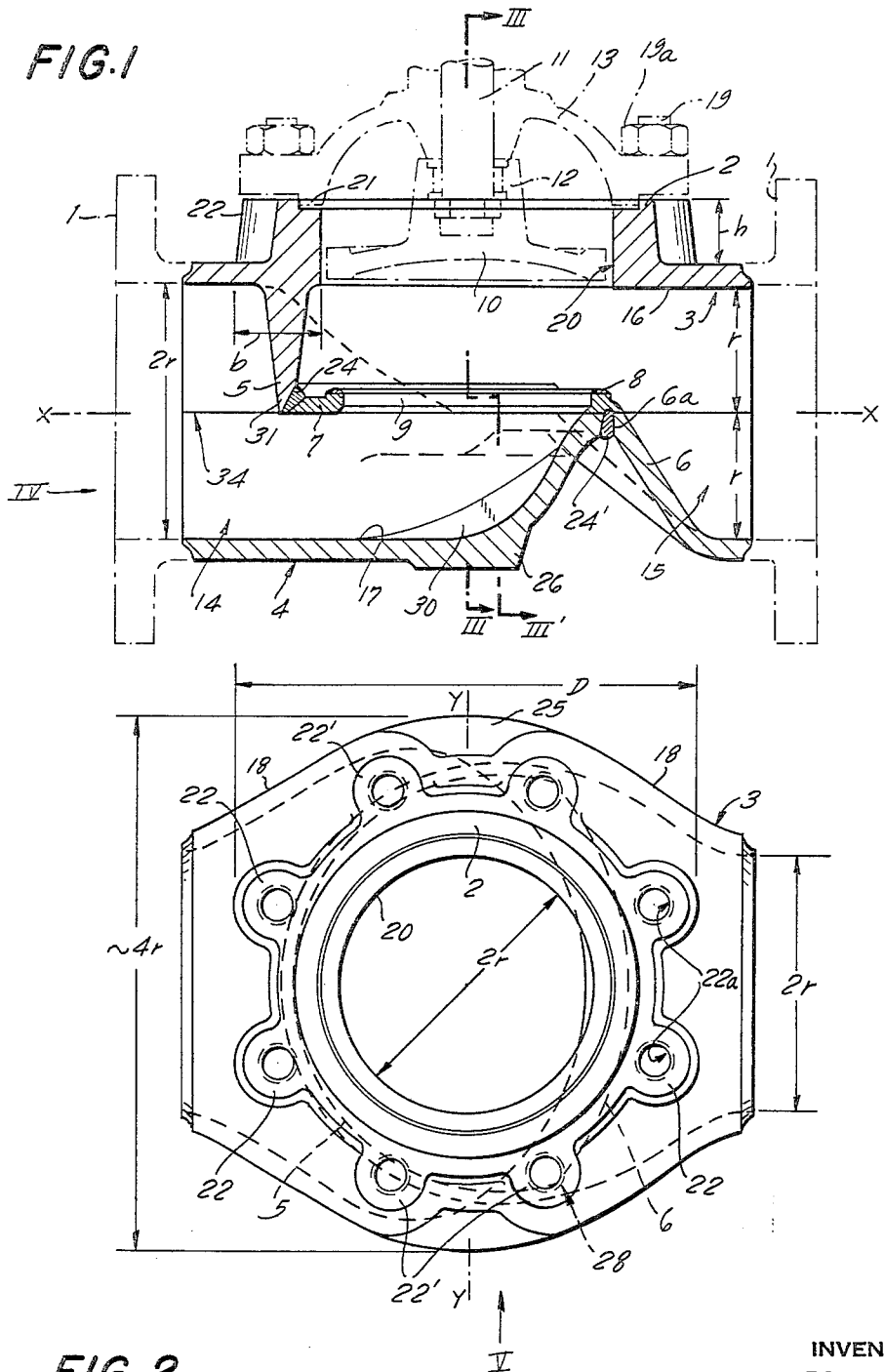
FIG. 1 is a longitudinal central vertical section through a globe valve wherein the valve body is constructed and assembled in accordance with a first embodiment of the present invention, certain parts of the valve being indicated by broken lines.
FIG. 2 is a top plan view of the valve body.

The globe valve shown in FIG. 1 comprises a relatively low or flat valve body which includes two matching sections or halves 3 and 4. These sections define a circular inlet 14 at one end and a circular outlet 15 at the other end of the valve body and are welded to each other in a first reference plane X—X which halves the inlet 14 and the outlet 15. A second reference plane Y—Y (FIG. 2) of the vlave body is normal to the plane X—X and halves a circular opening 20 in the upper section 3. The first reference plane X—X is located at the inner side of the opening 20. The numerals 1 denote in FIG. 1 two flanges which are to be welded to the valve body upon completed assembly of the section 3 and 4. The sections 3 and 4 are produced by drop forging and the upper section 3 is integral with an annulus 2 which is externally adjacent thereto and has an opening which registers with the opening 20. The annulus 2 serves to support the cover 13 of the globe valve and is provided with an even number of equidistant external protuberances 22, 22′ best shown in FIG. 2. Each of these protuberances is provided with a tapped bore 22a whose axis is normal to the reference plane X—X and which can receive a threaded bolt 19 for a nut 19a serving to secure the cover 13 to the flat top face of the annulus 2.

Figure 6:
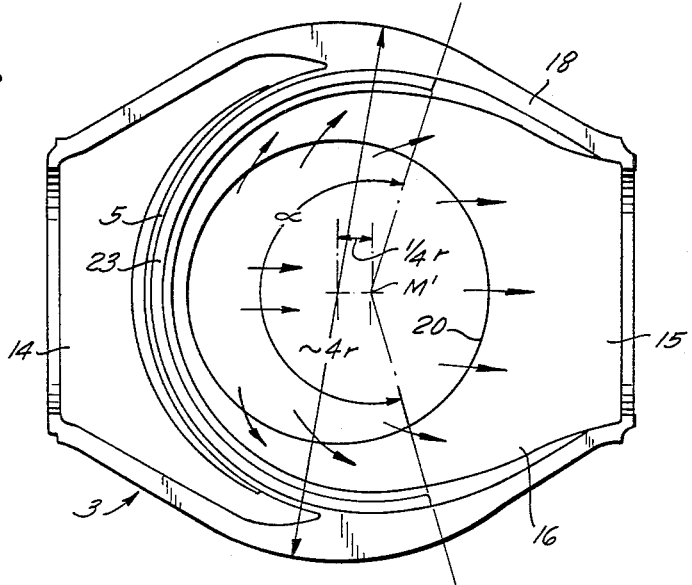
FIG. 6 is a bottom plan view of the upper section of the valve body.

The upper section 3 is provided with an arcuate internal rib 5 the major portion of which is located at the left-hand side of the reference plane Y—Y (see FIG. 6). The lower section 4 is also provided with an internal rib 6 which is of V-shaped cross section and is located at the right-hand side of the reference plane Y—Y. The apices of the ribs 5, 6 extend to the reference plane X—X and are welded to a seat ring 7 which is preferably produced by forging. As shown in FIG. 1, the seat ring 7 is located in or near the reference plane X—X and its outline is substantially oval (see FIG. 8) with the longer axis of the oval outline located in or close to the parallel with the reference plane Y—Y. The top face of the seat ring 7 is connected with an annular valve seat 8 for a valve disk 10 which is reciprocable in the opening 20 and has a hub 12 connected with the lower end of a rising valve stem 11. The stem 11 extends through the central portion of the cover 13 and meshes with a spindle nut (not shown) provided in a customary bonnet carried by the upper section 3. The rings 7 and 8 define a circular passage 9 for the flow of a fluid medium from the inlet 14 to the outlet 15. This passage 9 will be sealed when the stem 11 is rotated in a sense to move downwardly and to place the disk 10 into sealing engagement with the seat 8. The lower end portion of the stem 11 is rotatably secured to the hub 12, and the central portion of the cover 13 is provided with a customary packing for the stem.

Figure 4:
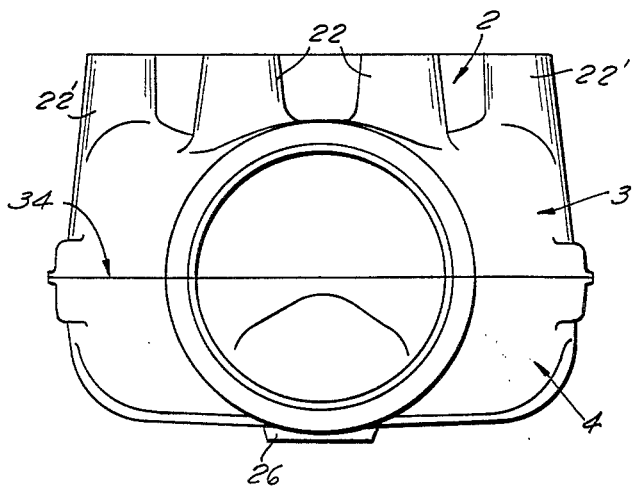
FIG. 4 is an end elevational view of the valve body as seen in the direction of the arrow IV in FIG. 1.

The abutting edge faces of the sections 3 and 4 are welded to each other in the reference plane X—X as shown in FIG. 4 at 34. As stated before, the plane X—X halves the inlet 14 and the outlet 15 and this plane is parallel to the top face of the seat 8. The radius of the circular passage 9 in the ring 7 and seat 8 preferably equals or closely approximates the radii $r$ of the inlet 14 and outlet 15. As a rule, the radius of the passage 9 will be identical with a radius $r$.

Figure 7:
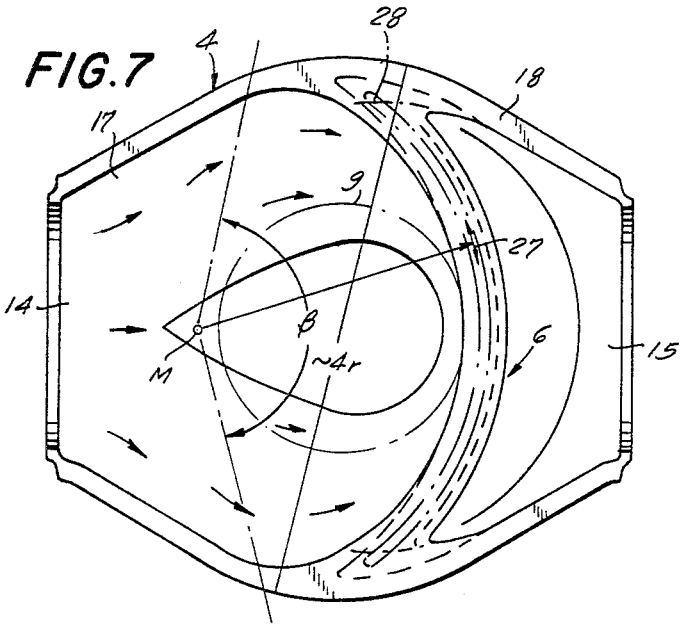
FIG. 7 is a top plan view of the lower section of the valve body.

The concave inner sides of the ribs 5 and 6 face the reference plane Y—Y from opposite sides and each of the sections 3, 4 further comprises a substantially conchoidal part which extends from one of the ends of the valve body to the concave side of the respective rib. Thus, and as best shown in FIG. 7, the conchoidal part of the lower section 4 extends from the inlet 14 toward the rib 6 and flares outwardly in a direction toward the reference plane Y—Y. Its depth (as considered at right angles to the plane X—X) is substantially constant and equals a radius $r$ (see FIG. 1) and its maximum width approximates $4r$. As clearly shown in FIG. 7, the length of the section 4 from the inlet 14 to the outlet 15 approximates or equals its maximum width in or close to the reference plane Y—Y. The same applies for the upper section 3.

The conchoidal part of the upper section 3 extends from the outlet 15 to the concave side of the upper rib 5 and has a depth $r$ and a maximum width $4r$ (see FIG. 6). The ridges or bottom portions 16, 17 of the upper and lower conchoidal parts are flat (i.e., substantially parallel to the reference plane X—X) and these ridges become wider in directions toward the reference plane Y—Y. The upper ridge 16 is provided with the opening 20 which registers with the passage 9. The maximum width of the ridges 16, 17 in or close to the reference plane Y—Y approximates or equals the maximum external diameter D of the annulus 2 (see FIG. 2). The projections of the two conchoidal parts in the reference plane X—X are of substantially circular outline and each thereof comprises two mirror symmertical lateral portions 18 which are relatively short and extend to both sides of the reference plane Y—Y (FIG. 2 or 6). These lateral portions 18 are substantially tangential to the circular outlines of the respective conchoidal parts. The combined height of the sections 3, 4 is less than their width (plane Y—Y) or length (from inlet 14 to outlet 15).

The remainder of each section (at the convex side of the respective rib) tapers toward the opposite end of the valve body. Thus, and as shown in FIG. 6, the left-hand part of the upper section 3 at the convex side of the upper rib 5 tapers toward the inlet 14. The right-hand part of the lower section 4 (see FIG. 7) at the convex side of the lower rib 6 tapers toward the outlet 15. Such configuration of the sections 3 and 4 insures that the fluid which is admitted through the inlet 14 in the form of a solid cylindrical stream expands laterally on its way toward the passage 9 and is gradually deflected toward the reference plane X—X to enter the passage 9. Thus, the originally cylindrical stream is converted into a wider but shallower stream which can readily flow through the passage 9 and is thereupon gradually reconverted into a cylindrical stream on its way toward and through the outlet 15. The manner in which the fluid flows through the passage 9 and toward the outlet 15 is indicated in FIG. 6 by arrows. The widening of the originally cylindrical stream on its way from the inlet 14 toward the passage 9 is indicated by arrows shown in FIG. 7. The concave side of the lower rib 6 directs the fluid into the passage 9 and the conchoidal part of the upper section 3 thereupon reduces the width of the fluid stream during flow toward the outlet 15.

As shown in FIG. 1, the height $h$ of the annulus 2 is substantially constant and this annulus is integral with the leftmost portion of the upper conchoidal part directly above the seat 8. The height $h$ approximates or equals the maximum thickness $b$ of the annulus 2, namely, the maximum radial distance between the outermost point of a protuberance 22 or 22′ and the internal surface of the annulus. The cross section of the annulus (without the protuberances 22, 22′) resembles the frustum of a cone (see FIG. 1) but its external surface tapers only slightly in a direction away from the reference plane X—X. Such configuration of the annulus 2 is desirable because the annulus can be forged together with the upper section 3. The section 3 is preferably forged without the opening 20, i.e., this opening is formed in a semifinished forging which includes the annulus 2, upper rib 5 and the two parts at the concave and convex sides of the rib 5. The top face of the annulus 2 is provided with a shallow annular groove or recess 21 which receives a packing serving to prevent leakage of fluid between the section 3 and the cover 13. In the illustrated embodiment, the annulus 2 comprises eight protuberances 22, 22′ which are quidistant from each other. The protuberances 22′ are disposed in pairs and the protuberances 22′ of each such pair are mirror symmetrical to the reference plane Y—Y (see FIG. 2). It is clear that the annulus 2 can be provided with six, ten or more protuberances, but the number of such protuberances is preferably an even number. The protuberances 22, 22′ merge into the upper section 3 and it will be noted that the protuberances 22 merge into the flattened central part of the section 3. The two right-hand protuberances 22 (FIG. 2) merge into the flaring portion of the upper ridge 16.

The heretofore described configuration of the sections 3 and 4 renders it possible to produce such sections by drop forging and by resorting to relatively simple dies. The lower die which is used in forging of the upper section 3 will define the external surface of the upper section. The cavity of such lower die can be finished by turning, excepting for the recesses which accommodate the protuberances 22 and 22′. Such recesses will be formed by resorting to a boring tool. The upper die (which defines the outline of the inner side of the upper section 3) is also of very simple configuration and comprises a solid central part or boss which is provided with a milled arcuate groove to receive the material which will form the upper rib 5.

Figure 5:
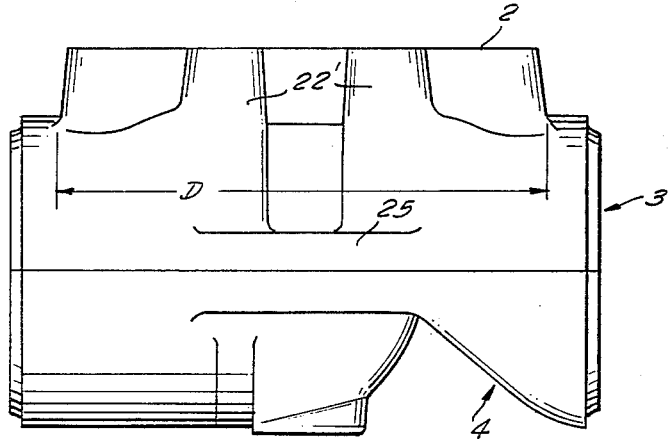
FIG. 5 is a side elevational view of the valve body as seen in the direction of the arrow V in FIG. 2.

The upper rib 5 extends along an arc 23 (FIG. 6) whose center M′ of curvature is located between the reference plane Y—Y and the outlet 15. The distance between the center M′ and the plane Y—Y equals or approximates ¼r and the arc extends along an angle alpha of more than 180 degrees, preferably 230 degrees. Both ends of the arc 23 merge into the respective lateral portions 18 of the upper section 3. The arc 23 is part of a circle, and this renders it possible to machine its surfaces with a simple turning tool prior to formation of the welded seam 24 (see FIG. 1) which connects the rib 5 with the adjoining portion of the seat ring 7. In the regions between the paired protuberances 22′, the rib 5 constitutes the side wall of the upper section 3. The lateral portions 18 of the section 3 merge into the protuberances 22′ (see FIG. 5). Flat strip-shaped portions 25 remain between the roots of the protuberances 22′ and the edge face of the section 3 for welding to the corresponding strip-shaped portions of the lower section 4.

Figure 3:
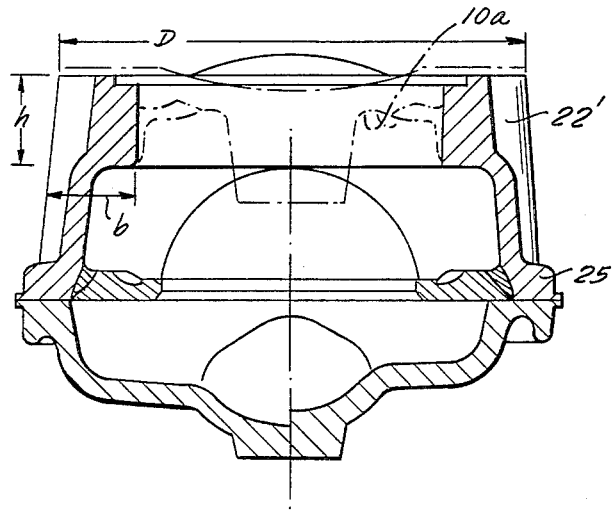
FIG. 3 is a transverse vertical section taken in part along the line III—III and in part along the line III–III' of FIG. 1.

FIG. 3 indicates by phantom lines a plug 10a which resembles a disk 10 and is obtained by removing the center of the upper section 3 upon completion of the drop forging operation. Such removal can be carried out by punching and the plug 10a can be converted into a valve disk.

The lower rib 6 extends along an arc 27 (see FIG. 7) which makes an angle beta of less than 180 degrees, preferably about 140 degrees. The radius of curvatures of the arc 27 exceeds 2r, i.e., the maximum radius of the conchodial part of the lower section 4. The center M of curvature of arc 27 is located between the inlet 14 and the reference plane Y—Y and is preferably disposed at a considerable distance from the plane Y—Y. The welded seam 24′ (FIG. 1) which connects the arc 27 with the corresponding portion of the seat ring 7 crosses the welded seam 24 at 28 (FIG. 7), i.e., in the region where the arc 23 merges into the corresponding lateral portions 18. The arc 27 is provided at the apex of the lower rib 6.

As shown in FIG. 1, the arc 23 of the upper rib 5 is provided with a centering or locating groove 31 for the adjoining portion of the seat ring 7. The ring 7 is inserted into the groove 31 in such a way that its underside extends into or is parallel to the reference plane X—X. The top face of the annulus 2 is also parallel to the reference plane X—X, and the same holds true for the top face of the seat ring 7 and the seam 34 which connects the sections 3 and 4 to each other. The top face of the arc 27 at the apex of the lower rib 6 is located in or is parallel with the reference plane X—X; this top face is preferably coplanar with the abutting edge faces of the sections 3 and 4. This allows for accurate and relatively inexpensive machining of such faces in a single operation. The machining is necessary to insure the formation of satisfactory welded seams 34 and 24′. As shown in FIG. 1, the seam 24′ can be formed in a groove 6a which is machined into the outer side and along the apex of the lower rib 6. This groove is then filled with material which forms seam 24′. The seams 24, 24′ and 34 are formed by arc welding in vacuo.

Figure 9:
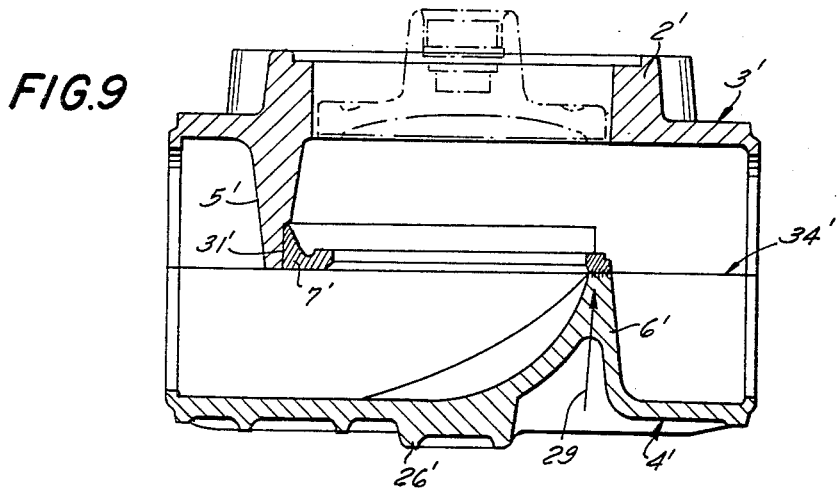
FIG. 9 is a central longitudinal vertical sectional view of a modified valve body.

Another mode of welding the lower rib 6′ of a lower section 4′ to a seat ring 7′ is illustrated in FIG. 9. An electron beam 29 is directed from below through the apex of the rib 6′. A second electron beam can be used to weld the seat ring 7′ to the surface bounding the recess or groove 31′ in the upper rib 5′. The groove 31′ is preferably surrounded by a cylindrical portion of the rib 5′. Electron welding can also be employed to form the seam 34′ along the abutting edge faces of the sections 3′ and 4′.

The lower section 4 or 4′ can be produced by drop forging in a relatively simple apparatus. The cavity of the lower die which defines the outer surface of the section 4 or 4′ may be formed by resorting to relatively simple turning machinery. The upper die has a centrally located projecting portion or boss which is formed with an arcuate groove to receive the material which will form the rib 6 or 6′.

If desired, the exposed surface of the lower section 4 or 4′ may be provided with a relatively small solid or annular wart-like projection or platform 26 or 26′. As shown in FIG. 1, the projection 26 is located opposite an oval depression 30 in the internal surface of the lower section 4. Valve bodies with such depressions 30 can be utilized in valves wherein the disk 10 is replaced by a flow-regulating cone.

The seat ring 7 or 7′ is preferably produced by drop forging and is obtained by removing material from a prefabricated disk-shaped blank of oval outline. The passage 9 or 9′ is formed in the blank by cutting or punching. The disk which is removed from the blank during the formation of the passage 9 or 9′ can be used as a starting blank for the production of a seat ring in a smaller valve body. The material of the seat ring is preferably a high-quality rustproof steel, for example, one known under the name "Niroststahl."

Figure 8:
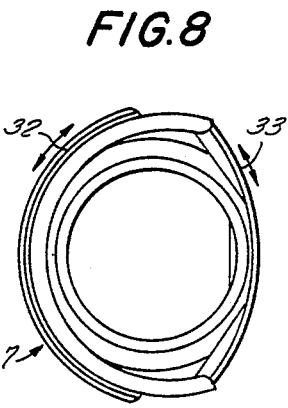
FIG. 8 is a smaller-scale top plan view of the seat ring.
Figure 10:
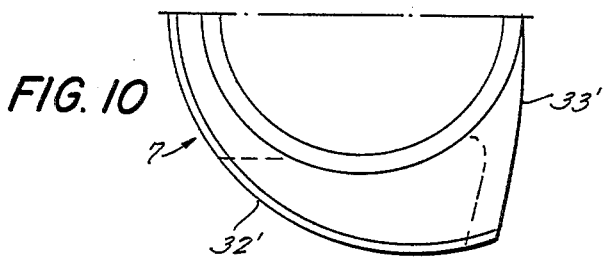
FIG. 10 is a top plan view of one-half of the seat ring in the valve body of FIG. 9.

As shown in FIG. 8, the seat ring 7 comprises an arcuate portion 32 which is fitted into the groove 31 of the upper rib 5. Another arcuate portion 33 (which is shorter than the portion 32) is welded to the arc 27 at the apex of the lower rib 6. The portion 33 extends along an angle of 140 degrees, and the portion 32 extends along an angle of 230 degrees. In FIG. 10, the arcuate portions of the seat ring 7′ are respectively indicated at 32′ and 33′.

An important advantage of the valve body shown in FIGS. 1 or 9 is that, even though a valve which embodies such body is a flow-control valve (i.e., it offers some restrictions to the flow of fluid therethrough), the deflection of fluid during flow through the passage 9 or 9′ is very small so that the valve offers little resistance to such flow. The flow of fluid from the inlet to the passage 9 or 9′ is obstructed very little because the two sections 3, 4 or 3′, 4′ diverge laterally from the inlet toward the passage, and the same holds true in reverse for the flow of fluid from the passage toward the outlet. During entry into the passage, fluid flows from the conchoidal part of the lower section 4 or 4′ and flows across the reference plane X—X to enter the innermost zone of the upper conchoidal part. The convex outer side of the upper rib 5 or 5′ forces the inflowing fluid to advance toward the outwardly flaring maximum-diameter region of the lower conchoidal part (section 4 or 4′) whence the thus displaced fluid flows radially into and through the seat ring 7 or 7′. The reverse occurs when the fluid enters the upper section 3 or 3′, i.e., the fluid first forms a flat stream which is gradually converted into a solid cylindrical stream prior to leaving the valve body via outlet 15.

Another important advantage of the improved valve body is that it can be produced with little loss in expensive material. The forging operation produces very little waste and, as mentioned above, the material which is removed from the upper section to form the opening for the valve disk and/or the material which is removed from the disk-shaped blank for the seat ring 7 or 7' can be used to form valve disks or smaller size seat rings. Moreover, and since the valve body is relatively flat, the machining of cavities into the dies of the drop forging machine is less expensive and such relatively shallow cavities can be filled with material by resorting to relatively low pressures. Also, the outlines of such cavities can be precision-finished by conventional milling, turning and boring tools because many of these outlines are circular or part-circular. The wear and stresses upon dies with relatively shallow recesses are rather low.

The annulus 2 or 2' (FIG. 9) contributes considerably to the rigidity of the upper section 3 or 3'. This annulus is preferably formed without a flange and, as stated before, can be forged as an integral portion of the conchoidal part of the upper section. However, it is equally within the purview of the present invention to form the upper section 3 or 3' with a flanged annulus which is thereupon bolted to the flange of the cover in a manner known from the art of conventional valves. Alternatively, and if the annulus 2 or 2' is formed without protuberances, it can be provided with a flange which is produced separately and is welded or otherwise bonded to the annulus. The axial length or height $h$ of the annulus 2 or 2' is preferably selected in such a way that the later can accommodate the valve disk.

Welding of sections 3, 4 or 3', 4' to each other can be carried out in presently known welding apparatus and presents no problems because the edge faces to be bonded to each other are of substantially circular outline. The same holds true for the seams between the ribs and the seat ring. Such faces which must be welded to each other but do not extend along an arc which forms part of a circle are relatively short. When the valve body is mounted in a welding apparatus, it is simply rotated about the axis of its passage 9 or 9', i.e., about the axis of the valve stem.

The seat ring 7 or 7' is preferably secured in place in two successive operations. As a rule, the ring 7 or 7' is first fitted into the groove 31 or 31' of the upper rib 5 or 5' and is welded thereto by means of an arcuate seam (such as the seam 24 in FIG. 1). In the next step, the ring 7 or 7' is welded to the lower section 4 or 4' (e.g., by means of the seam 24' shown in FIG. 1). The seat ring can be precision finished prior to insertion into one of the sections, and the seams 24, 24' extend along arcs with relatively large radii of curvature which is desirable in automatic welding. Since the outline of the seat ring 7 or 7' is oval or nearly oval, it can be accurately centered in the upper rib 5 or 5' prior to joining of the sections 3, 4 or 3', 4'. The edge faces of the sections and the bottom face of the set ring 7 or 7' are then located in a plane which coincides with or is parallel to the reference plane X—X so that all such faces can be precision-finished prior to welding of sections to each other. Since the top face of the annulus 2 or 2' is preferably parallel to the plane X—X, such top face can be finished with a high degree of precision to insure that the axis of the valve stem 11 will make right angles with the plane X—X. Also, and since the seat ring 7 or 7' is initially welded to the upper rib 5 or 5' either by arc welding or by electron welding, the edge faces of the lower section 3 or 3' can be readily machined to a desired degree of finish. The same holds true for the arcuate apex portion of the lower rib 6 or 6'.

The arcuate shape of the ribs 5, 6 or 5', 6' influences the width of the sections 3, 4 or 3', 4' so that such width preferably equals the length of the sections.

The manufacturing cost (per pound) of flanges 1 and pipe lines in which the valve body of the present invention is used is less than the cost of sections 3, 4 or 3', 4'. This is due to the fact that the sections are produced by drop forging and are welded to each other. Therefore, it is desirable to keep the weight and the dimensions of the valve body to a minimum. Reduction in the dimensions brings about savings in the manufacture of dies.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A substantially T-shaped valve body, particularly for use in large globe valves, having a substantially circular inlet at one end, a substantially circular outlet of substantially the same diameter as said inlet at the other end, an opening intermediate said ends, a first reference plane halving said inlet and said outlet at one side of said opening, and a second reference plane normal to said first plane and halving said opening, said valve body comprising a first forged section located at one side of said first plane and provided with said opening and a forged mating second section at the other side of said first plane, the length of said sections from said inlet to said outlet approximating the width thereof and said sections including arcuate internal ribs disposed substantially at the opposite sides of and having concave sides facing said second plane, each of said sections further including a shallow conchoidal part extending from one of said ends to the respective rib, each of said parts having a constant depth substantially equal to half of said diameter, as considered at right angles to said first plane, and flaring outwardly from the respective end towards said second plane to a distance substantially twice said diameter so that the depth of each conchoidal part substantially equals one fourth of the maximum width thereof.

2. A valve body as defined in claim 1, wherein each of said conchoidal parts comprises a substantially flat ridge portion.

3. A valve body as defined in claim 1, further comprising a seat ring secured to said ribs and located substantially in said first reference plane, said seat ring having an oval outline with the longer axis of said oval outline located substantially in said second reference plane.

4. A valve body as defined in claim 3, wherein said sections and said seat ring are welded to each other.

5. A valve body as defined in claim 4, wherein the rib of said first section has an arcuate recess extending along an arc in excess of 180 degrees and accommodating a portion of said seat ring.

6. A valve body as defined in claim 5, wherein the center of curvature of said arc is located between said second reference plane and said outlet and the radius of curvature of said arc approximates half the maximum width of one of said conchoidal parts.

7. A valve body as defined in claim 6, wherein the distance between said center of curvature and said second reference plane approximates one-eighth of the diameter of said opening.

8. A valve body as defined in claim 3, wherein the rib of said second section is of V-shaped cross-sectional outline and a portion of said seat ring is welded to the apex of said last mentioned rib.

9. A valve body as defined in claim 8, wherein said apex extends along an arc of less than 180 degrees and wherein the radius of curvature of said arc exceeds half the maximum internal width of one of said conchoidal parts.

10. A valve body as defined in claim 9, wherein the center of curvature of said arc is located between said inlet and said second reference plane.

11. A valve body as defined in claim 3, further comprising a cover-supporting annulus provided externally of and integral with said first section, said annulus having an opening in registry with said first mentioned opening.

12. A valve body as defined in claim 11, wherein said annulus has a relatively small constant height as seen at right angles to said first reference plane.

13. A valve body as defined in claim 11, wherein said annulus comprises equidistant external protuberances.

14. A valve body as defined in claim 13, wherein said annulus comprises an even number of protuberances and wherein said protuberances are provided with tapped bores whose axes are normal to said first reference plane.

15. A valve body as defined in claim 13, wherein said proturberances comprise two pairs of protuberances which are mirror symmetrical with reference to said second plane.

16. A valve body as defined in claim 15, wherein said protuberances merge into said first section.

17. A valve body as defined in claim 16, wherein said first section comprises a pair of strip-shaped marginal portions each extending outwardly beyond one pair of said mirror symmetrical protuberances.

References Cited

UNITED STATES PATENTS

| | | | |
|---|---|---|---|
| 1,991,006 | 2/1935 | Wilson | 251—367 XR |
| 2,269,404 | 1/1942 | Haven et al. | 251—366 XR |
| 2,309,666 | 2/1943 | Parker | 29—157.1 XR |
| 2,570,413 | 10/1951 | Volpin | 251—366 XR |
| 2,682,701 | 7/1954 | Pote | 29—157.1 |
| 2,752,669 | 7/1956 | Carr | 29—157.1 XR |
| 2,869,221 | 1/1959 | Siepmann | 251—366 XR |

FOREIGN PATENTS

| | | |
|---|---|---|
| 489,602 | 7/1938 | Great Britain. |
| 741,936 | 11/1943 | Germany. |

SAMUEL SCOTT, Primary Examiner